United States Patent [19]

Degnan, Jr. et al.

[11] Patent Number: 4,884,531
[45] Date of Patent: Dec. 5, 1989

[54] OPERATION OF AN INTERNAL COMBUSTION ENGINE WITH A PRE-ENGINE REFORMER

[75] Inventors: Thomas F. Degnan, Jr., Yardley, Pa.; Ralph M. Dessau, Edison, N.J.

[73] Assignee: Mobil Oil Corporation, New York, N.Y.

[21] Appl. No.: 213,855

[22] Filed: Jun. 30, 1988

[51] Int. Cl.$^4$ ............................................. F02B 43/08
[52] U.S. Cl. ....................................................... 123/3
[58] Field of Search ..................................... 123/3, 1 A

[56] References Cited

U.S. PATENT DOCUMENTS

| | | | |
|---|---|---|---|
| 3,730,910 | 5/1973 | Albers et al. | |
| 3,855,980 | 12/1974 | Weisz et al. | 123/3 |
| 4,046,522 | 9/1977 | Chen | 48/102 |
| 4,070,993 | 1/1978 | Chen | 123/3 |
| 4,111,792 | 9/1978 | Caesar et al. | 208/79 |
| 4,560,820 | 12/1985 | Field | 585/489 |
| 4,567,857 | 2/1986 | Houseman et al. | 123/3 |
| 4,652,360 | 3/1987 | Dessau | 208/138 |
| 4,716,859 | 1/1988 | König | 123/3 |

OTHER PUBLICATIONS

J. P. DeLuca and L. E. Campbell, "Monolithic Catalyst Supports" in Advanced Materials in Catalysis, J. J. Burton and R. L. Garten, eds., Academic Press, New York (1977), pp. 293 to 324.
J. Wei, "Catalysis for Motor Vehicle Emissions", Adv. Catalysis, vol. 24 (1975), pp. 77–86.

Primary Examiner—E. Rollins Cross
Attorney, Agent, or Firm—Alexander J. McKillop; Charles J. Speciale; Malcolm D. Keen

[57] ABSTRACT

A method is provided of operating an internal combustion engine comprising subjecting a hydrocarbon fuel of relatively low octane number to in situ reforming at elevated temperatures by passing it through a reaction zone containing a substantially non-acid catalyst comprising a Group VIII hydrogenation/dehydrogenation metallic element, e.g., platinum, and an intermediate pore zeolite, e.g., having an X-ray diffraction pattern similar to that of an acidic zeolite which has a Constraint Index in the approximate range of about 1 to 12, such that the fuel leaving said reaction zone has an increased octane number, and passing the fuel to the combustion chamber of said engine.

20 Claims, 1 Drawing Sheet

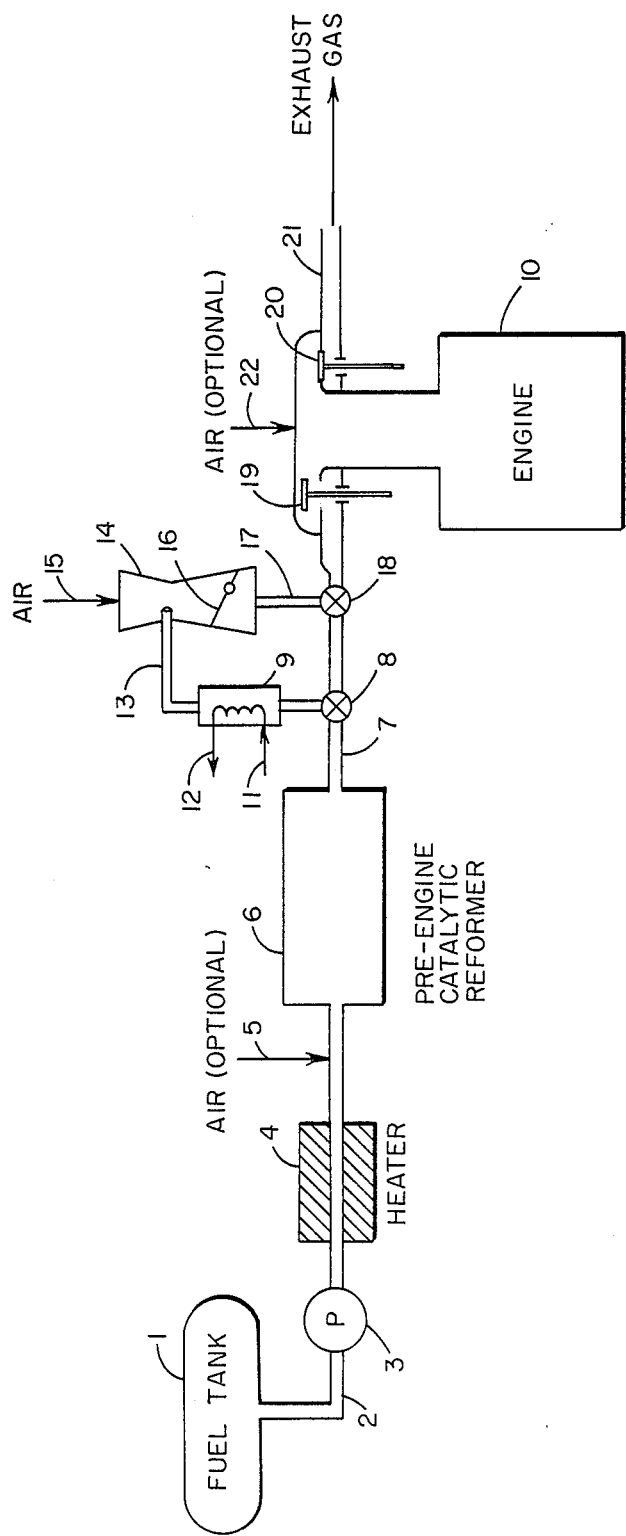

OPERATION OF AN INTERNAL COMBUSTION ENGINE WITH A PRE-ENGINE REFORMER

BACKGROUND OF THE INVENTION

1. Field of the Invention

This invention relates to the operation of an internal combustion engine employing a pre-engine catalytic reformer for upgrading the octane number of the fuel.

2. Background Information

Pre-engine converters utilizing catalysts comprising intermediate pore zeolites for improving the octane number of fuels utilized in internal combustion engines are known in the art as shown in the Information Disclosure Statement set out hereinafter. However such catalysts generally rely for their effect on a substantial degree of acidic cracking activity. They are not particularly effective for catalyzing reactions more prevalent in a reforming than a cracking process, e.g., dehydrogenation and dehydrocyclization such as are utilized for the conversion of n-paraffins to aromatics in the presence of cycloparaffins. In many instances, the latter reactions are more effective in raising the octane number of a low octane chargestock than primarily cracking reactions, particularly in the synthesis of aromatics which are especially significant in obtaining higher octane numbers of gasolines.

There are many primarily reforming catalysts known in the art which are suitable for use in a refinery for the purpose of upgrading the octane number of refinery streams intended as gasoline blending components. However, these catalysts have usually not been suggested for use in a pre-engine converter, and, in fact, conventional reforming catalysts, such as those comprising platinum supported on alumina, deactivate fairly rapidly under the conditions preferred for the operation of a pre-engine converter, e.g., the absence of added hydrogen and the use of relatively low absolute pressure. These conditions are unlike those usually employed in a refinery which generally include, for example, hydrogen addition and the employment of higher absolute pressures. Other reforming catalysts disclosed i the art, e.g., comprising a Group VIII metal and a non- or low-acid intermediate pore zeolite, are also generally intended to be used with hydrogen in a refinery reforming process.

INFORMATION DISCLOSURE STATEMENT

The following information is disclosed in accordance with the terms of 37 CFR 1.56, 1.97 and 1.98.

U.S. Pat. No. 3,855,980 discloses a pre-engine converter containing a bed of ZSM-5 or ZSM-8 zeolite catalyst which has substantial acid cracking activity as indicated by a high alpha value. Also disclosed is the use of hot exhaust gases to provide heat necessary to drive the cracking process occurring within the converter.

U.S. Pat. No. 4,046,522 discloses a pre-engine converter comprising a bed of "cracking catalyst of the ZSM-5 zeolite type" to convert the hydrocarbons in a fuel mixture comprising hydrocarbons and oxygenated organic compounds, to a higher octane gaseous hydrocarbon fuel. Also disclosed is the use of the hot exhaust gases from the engine to heat the hydrocarbons undergoing reaction in the converter.

U.S. Pat. No. 4,070,993 teaches a pre-engine converter containing a ZSM-5 zeolite cracking catalyst for the conversion of a low octane fuel, into which oxygen has been mixed, to produce a higher octane gaseous product. The patent also discloses providing heat to the conversion reaction by adding a controlled amount of an oxygen-containing gas, e.g., air, to the fuel being fed to the converter so as to combust a minor amount of such fuel, and/or by heat exchange with the exhaust gases from the engine.

None of the foregoing references discloses or suggests the use of a primarily reforming catalyst in the converter and specifically a non-acid catalyst comprising an intermediate pore zeolite.

U.S. Pat. No. 4,652,360 discloses low- or non-acid catalysts comprising an intermediate pore zeolite and a Group VIII metal used in various hydrocarbon conversion processes, including reforming of a hydrotreated naphtha to raise its octane number. However, there is no teaching of these catalysts in a pre-engine converter for the purpose of raising the octane number of a low octane fuel.

U.S. Pat. No. 4,560,820 teaches a process of dealkylating alkylaromatic hydrocarbons, e.g., toluene to produce benzene, using a catalyst comprising an intermediate pore size zeolite substantially free of acidity, and platinum. However, there is no suggestion in this patent of the use of the disclosed catalyst to reform a naphtha, which generally contains a preponderance of aliphatics, to raise its octane number, nor is there any suggestion of the use of the catalyst in a pre-engine reformer.

J. P. DeLuca and L. E. Campbell, "Monolithic Catalyst Supports" in *Advanced Materials in Catalysis*, J. J. Burton and R. L. Garten, eds., Academic Press, New York (1977), pages 293 to 324, teach various structures and catalytic agents in monolithic catalysts and methods for their fabrication.

U.S. Pat. No. 3,730,910 teaches various methods for depositing zeolites on substrate surfaces, e.g., monoliths. The deposited zeolite may be used as cracking or hydrocracking catalysts.

J. Wei, "Catalysis for Motor Vehicle Emissions", Adv. Catalysis, Vol. 24 (1975), pages 77-86, teaches the use of monolithic structures comprising various materials useful as oxidation catalysts applied to the treatment of gasoline engine exhaust gases.

None of the foregoing references disclosing monolithic catalysts teaches the use of such monoliths in a pre-engine reformer for the purpose of upgrading low octane fuels.

Copending application Ser. No. 133,401, filed Dec. 15, 1987 by Chen et al., teaches a pre-engine converter comprising a zeolite incorporated in a monolithic structure.

SUMMARY OF THE INVENTION

In accordance with this invention, a relatively low octane incoming fuel is converted to a higher octane fuel in the operation of an internal combustion engine by passing the incoming fuel at conversion temperatures through a pre-engine reformer situated between the fuel pump and the carburetor or fuel injector of the engine, such reformer containing a non-acid reforming catalyst comprising a Group VIII hydrogenation/dehydrogenation metallic element and a non-acid intermediate pore zeolite, preferably a zeolite having an X-ray diffraction pattern similar to that of a corresponding acidic zeolite which has a Constraint Index (CI), as hereinafter defined, in the approximate range of about 1 to 12.

BRIEF DESCRIPTION OF DRAWING

The drawing is a schematic diagram of an internal combustion engine utilizing a pre-engine catalytic reformer containing a non-acid catalyst comprising a Group VIII hydrogenation/dehydrogenation metallic element and an intermediate pore zeolite, in accordance with this invention.

DESCRIPTION OF SPECIFIC EMBODIMENTS

The catalyst utilized in the pre-engine reformer of this invention may be in particulate form, e.g., pellets, beads or powder, or when pressure drop is of concern, a monolith or combination of monoliths. If it is preferred to employ the catalyst in the form of monoliths then the techniques of preparing and employing the monoliths may be applied as disclosed in previously cited copending application Ser. No. 133,401, except that the catalyst is as described in this disclosure rather than that of the copending application. For this purpose, the entire disclosure of the cited copending application is incorporated by reference.

Since the reactions involved in the upgrading of the octane number of the fuel by reforming, e.g., hydrogenolysis, dehydrogenation and dehydrocyclization with substantially no acid-catalyzed cracking activity, require an elevated reaction temperature and are endothermic in their totality, it is necessary to supply heat to the reaction. This may be done under the invention by any known means, e.g., heat exchange between the incoming fuel and the hot exhaust gases, by passing the incoming fuel through the heated engine block, or partial combustion of the fuel by injecting a small amount of an oxygen-containing gas, e.g., air, with the fuel into the pre-engine reformer containing the zeolite catalyst.

Heating of the incoming fuel by hot exhaust gases may be accomplished by conventional heat exchange, e.g., wherein the pre-engine reformer is incorporated in the exhaust manifold of the engine similar to the arrangement shown with packed beds of zeolite catalyst in previously cited U.S. Pat. Nos. 3,855,980 and 4,070,993, or is enclosed within a shell, with the hot exhaust gases flowing through the space between the interior surface of the shell and the exterior surface of the monolith, similar to the arrangement shown in U.S. Pat. No. 4,046,522. When a catalytic converter is used for the oxidation of combustible components in the exhaust gas, such converter may be combined with the pre-engine reformer of this invention in a dual converter, with, for example, tubular reactors in each category being spatially arranged so that heat flows from the exhaust gases being converted to the endothermic reactions of the pre-engine reforming of the incoming fuel. To minimize pressure drops across this type of dual converter, alternating monolithic channel systems may be used as disclosed previously cited copending application Ser. No. 133,401, particularly in FIGS. 3 to 5 of that application.

To start a cold engine, a small amount of high octane gasoline may be fed to the carburetor or fuel injector from a separate tank. Alternatively, a small amount of the low octane fuel may, for example, be mixed with air and ignited using an electric heating coil or electricity from internal and/or external batteries may be used to warm up the reactor to at least 600° F. to initiate the conversion process. After that, only a small amount of air is needed to maintain the reactor temperature. Heat from the operation of the engine may also be used to supply the temperature requirement once the engine is warm, either by passing the incoming fuel through a heat exchanger that transfers heat to the fuel from the engine exhaust gases directly or from the catalytic conversion of the oxidizable components in such gases, or by passing the fuel through the heated engine block, as discussed previously.

Referring to the drawing, relatively low octane fuel is pumped from fuel tank 1 through line 2 by pump 3 through heater 4 where the fuel is volatilized and heated at least to a predetermined conversion and/or combustion temperature. The heat source in heater 4 in the case of a cold engine may be, for example, the combustion of a small amount of fuel mixed with air and ignited with an electric heating coil, or electricity from internal and/or external batteries, while, in a warm engine, the heat source may be heat from the engine block or from the exhaust gases, either directly or in the course of the catalytic conversion of the oxidizable components in such gases. Air is optionally added to the heated fuel from line 5 which then passes through pre-engine catalytic reformer 6 containing a zeolite catalyst of the type contemplated under this invention. If air is not added from line 5 to the heated fuel, then the temperature to which the fuel is heated must be high enough to sustain the reforming reactions in reformer 6 at the necessary temperatures. However, if air is supplied from line 5, then the heat added to the fuel in heater 4 need only be sufficient to heat the fuel to combustion temperature. Thereafter, the partial combustion of the fuel in the presence of oxygen is sufficient to provide the necessary heat to sustain the reforming reactions. From reformer 6, the upgraded fuel with increased octane number which, despite the heat consumption in reformer 6, may still be above ignition temperature, passes through line 7 and depending on the position of selector valve 8, may enter cooler 9 where it is cooled by coolant from the radiator of engine 10 which enters cooler 9 by line 11 and leaves by line 12. The cooled upgraded fuel passes through line 13 to carburetor 14 where it is mixed with air from line 15. The cooled fuel-air mixture, metered by throttle 16, returns through line 17 to line 7 at selector valve 18 and thence through intake valve 19 into the intake manifold engine 10 for utilization in the engine. Hot exhaust gases are passed through exhaust valve 20 and travel through line 21 to a catalytic converter (not shown) for oxidation of its oxidizable-components, or for discharge into the atmosphere. Alternatively, carburetion may be eliminated from the system by positioning selector valves 8 and 18 so that the upgraded fuel from converter 6 passes directly through line 7 into the intake manifold of the engine. In this case, air necessary for combustion of the fuel is injected directly into the engine through line 22.

After extended use, the catalyst can be regenerated using air. A suitable design would incorporate two or more reformer units, (not shown in the drawing), with one unit being in operation converting the hydrocarbon while the remaining units are undergoing regeneration. A microprocessor, complete with a $CO_2/CO$ detector to determine completion of the regeneration cycle, could be used to switch flows from one reformer unit to another.

As stated, the catalyst used in the pre-engine catalytic reformer of this invention comprises a Group VIII metallic element and a non-acid intermediate pore zeolite. The zeolite utilized in preparing the catalyst may be made by any of the methods known in the art. Thus, variations of the original method for the production of this type of zeolite utilizing an "organic template" provided by the presence of organic cations, are disclosed in U.S. Pat. No. 3,702,886 and U.S. Pat. No. Re. 29,948, and European Patent Application Publication No. 130,809. Alternatively, the zeolite may be prepared without employing any organic cations, but utilizing instead seeds of the desired zeolite in the formulating mixture which seeds themselves were formed in the presence of organic ions, etc., as disclosed, for example, in U.S. Pat. Nos. 4,175,114; 4,199,556; and 4,341,748. Moreover, the zeolites contemplated in the process of this invention may be formed in the absence of any organic ions or seeds of the type described, utilizing instead as precursor a silica or aluminosilicate which is precipitated or crystallized from solution or homogenous amorphous phase and having certain characteristics, as disclosed, for example in pending application Ser. No. 014,147, filed Feb. 12, 1987, or European Patent Application Publication No. 106,552 the entire disclosures of which are incorporated by reference. Other methods for the preparation of the desired zeolites, i.e., zeolites having x-ray diffraction patterns typical of such zeolites, are disclosed in the art and may also be used. If the zeolite is an aluminosilicate, it should be prepared using any of the foregoing methods so that the silica/alumina molar ratio of the zeolite is in the range, for example, of at least about 20 and up to about 26,000 or even higher.

The Group VIII hydrogenation/dehydrogenation metallic element of the catalyst is preferably platinum or palladium and most preferably platinum. It may be incorporated into the catalyst by ion exchange and/or sorption techniques. For example, ions of the Group VIII metallic element may be exchanged for the original alkali metal cations of a contemplated zeolite and/or sorbed onto the surface of such zeolite after such zeolite has been calcined, e.g., at a temperature of about 200° to 600° C., such as 538° C., at some stage of its production. The incorporation of the Group VIII hydrogenation/dehydrogenation metallic element is accomplished, for example, by contacting an aqueous solution of a salt of the Group VIII element with the zeolite at ambient or elevated temperature, e.g., by refluxing, for a period sufficient to effect the desired exchange and/or sorption or impregnation. Alternatively, the Group VIII metallic element may be incorporated into the zeolite by including a water-soluble salt of such element in the hydrothermal crystallization mixture used to prepared the zeolite. The zeolite is then washed with deionized water, dried, and optionally subjected to a thermal treatment in air, oxygen, or nitrogen, preferably air or oxygen, e.g., at a temperature of about 150° to 550° C., preferably about 350° C. Appropriate water-soluble salts of platinum which may be used for the inclusion of platinum in the catalyst are, for example, platinum amine complexes such as platinum tetraamine chloride and chloroplatinic acid. The Group VIII hydrogenation/dehydrogenation metallic element is incorporated into the zeolite in an amount, for example, of about 0.01 to 30 weight percent, preferably about 0.01 to 10 weight percent, and most preferably about 0.1 to 5 weight percent.

In view of its non-acidity, there is no upper limit on the silica/alumina ratio of any aluminosilicate zeolite employed which may approach infinity, i.e., contain substantially no alumina. However, even when a source of aluminum is not deliberately used in the preparation of the zeolite such as ZSM-5, because of the usual association of alumina with natural sources of silica, the silica/alumina ratio in the as synthesized zeolite will often be below 1000, if the silica is not treated to remove aluminum. The silica/alumina ratio of an aluminosilicate zeolite may be determined by conventional analysis. This ratio is meant to represent, as closely as possible, the ratio in the rigid anionic framework of the zeolite crystal and to exclude aluminum in the binder or in cationic or other form within the channels.

As stated, the non-acidic zeolite preferably has an X-ray diffraction pattern similar to that of an acidic zeolite which has a CI in the approximate range of 1 to 12 and, in the case of aluminosilicates, a silica/alumina ratio of at least about 20 as synthesized, are contemplated in the preparation of the catalyst. However, even when an as synthesized zeolite has some degree of acidity, e.g., in the case of an aluminosilicate zeolite has a silica/alumina ratio as synthesized below about 50, e.g., as low as 20, the acidity of the zeolite can be reduced by various procedures known in the art, e.g. steaming at a temperature of about 700° to 1300° F. for a period of about 0.5 to 20,000 hours, calcining in air at a temperature of about 800° to 1000° C. for a period of about 1 to 10 hours, or various framework exchange procedures to remove some aluminum, such as replacement of framework aluminum with silicon. The aluminum that is extracted from the framework may have to be subsequently removed from the zeolite (e.g. by acid extraction), or exchanged.

The cation-exchangeable sites of the non-acidic zeolite are occupied by cations other than hydrogen or hydrogen precursors, such as $NH_4^+$. Specifically, such sites are occupied by alkali metal or alkaline earth cations, e.g., $Na^+$, $K^+$, $Cs^+$, $Ca^+$, $Mg^{++}$, $Ba^{++}$, $Sr^{++}$, or admixtures thereof. These cations and particularly the alkali metal cations, serve to neutralize any acidity due to framework aluminum. The source of alkali metal cations can derive from cations incorporated during synthesis, in excess of the aluminum content thereof. Alternatively, one can treat the final product with a basic solution of an alkali metal hydroxide as a final step prior to use, as described for example in U.S. Pat. No. 4,652,360.

In addition to conventional aluminosilicates and substantially pure silica zeolites, "modified" zeolites in which the zeolite contains, for example, indium, tin, thallium and/or lead as a "modifier" metallic element, are also contemplated in the preparation of the catalyst used in the pre-engine reformer of this invention. These modified zeolites may be prepared using any of various methods. Thus, incorporation of the modifier can be accomplished during synthesis of the zeolite or postsynthesis; and the materials can be prepared either by stepwise or simultaneous incorporation of the modifier and the Group VIII hydrogenation/dehydrogenation metallic element in the crystallization reaction medium. The Group VIII metallic element can be first introduced to the synthesis product with subsequent incorporation of the modifier or vice versa. Stepwise preparation includes techniques of cocrystallization, impregnation, or exchange. Crystallization with the modifier metallic element, e.g., indium, can be undertaken in a two phase system described in commonly assigned application Ser. No. 878,555, filed June 26, 1986. Other elements such as boron, iron, chromium, and/or gallium, may also be present. Simultaneous incorporation includes the combination of the modifier with the Group VIII dehydrogenation/hydrogenation metallic element, e.g., platinum, during synthesis (i.e., crystallization) or simultaneously after synthesis of the crystalline material.

A non-acidic zeolite, free of the modifier, can be treated with compounds of the modifier at elevated temperatures. Such treatments are conducted so that the source of modifier is either in the gaseous phase (such as indium chloride or stannic chloride), or the liquid phase including the aqueous phase (such as indium nitrate or sulfate, stannous or stannic sulfate, thallium (I) nitrate, or lead nitrate or acetate). Alternatively, an unmodified zeolite can simply be impregnated with a source of the modifier and then calcined at temperatures above 400° C.

The modified zeolite may contain, for example, from about 0.01 to 20 weight percent, preferably about 0.1 to 10 weight percent of the modifier metallic element, and about 0 to 10 weight percent of any of the previously mentioned boron, iron, chromium, or gallium.

The members of the class of zeolites useful herein have an average effective pore size of generally about 5 to about 7 angstroms, such as to freely sorb normal hexane. The term "average" as applied to the diameter of the pores is used to cover those pores which have an elliptical shape. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a non-acidic zeolite contemplated under this invention provides control to molecules of varying sizes to its internal structure is the Constraint Index of a corresponding acidic zeolite. Non-acidic zeolites which provide a highly restricted access to and egress from its internal structure have an X-ray diffraction pattern similar to corresponding acidic zeolites which have a high value for the Constraint Index, and non-acidic zeolites which provide relatively free access to the internal zeolite structure have an X-ray diffraction pattern similar to acidic zeolites which have a low value for the Constraint Index, and usually pores of large size, e.g., greater than 7 angstroms. The method by which Constraint Index is determined is described fully in U.S. Pat. No. 4,016,218, incorporated herein by reference for details of the method. Constraint Index (CI) values for some typical acidic materials are:

| | CI (at test temperature) | |
|---|---|---|
| ZSM-4 | 0.5 | (316° C.) |

-continued

| | CI (at test temperature) | |
|---|---|---|
| ZSM-5 | 6–8.3 | (371° C.–316° C.) |
| ZSM-11 | 5–8.7 | (371° C.–316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-38 | 2 | (510° C.) |
| ZSM-48 | 3.5 | (538° C.) |
| ZSM-50 | 2.1 | (427° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |
| Zeolite Beta | 0.6–2.0 | (316° C.–399° C.) |

The above-described Constraint Index is an important and even critical definition of acidic zeolites having X-ray diffraction patterns similar to those of the non-acidic zeolites which are useful in the instant invention. The very nature of this parameter and the recited technique by which it is determined, however, admit the possibility that a given acidic zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g., temperature, as to establish more than one value for the Constraint Index of a particular zeolite. This explains the range of Constraint Indices for some zeolites, such as ZSM-5, ZSM-11 and Beta.

It is to be realized that the above CI values typically characterize acidic zeolites having X-ray diffraction patterns similar to those of the specified non-acidic zeolites, but that such are the cumulative result of several variables useful in the determination and calculation thereof. Thus, for a given acidic zeolite exhibiting a CI value within the range to 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of 290° C. to about 538° C., the CI will have a value for any given zeolite of interest herein within the approximate range of 1 to 12.

The class of zeolites defined herein is exemplified by ZSM-5, ZSM-11, ZSM-12, ZSM-23, ZSM-35, ZSM-38, ZSM-48, ZSM-50, and other similar materials. The compositions, methods of preparation, and X-ray diffraction patterns of these zeolites are typified in the following patents: ZSM-5 in U.S. Pat. No. 3,702,886 and Re. No. 29,948; ZSM-11 in U.S. Pat. No. 3,709,979; ZSM-12 in U.S. Pat. No. 3,832,449; ZSM-23 in U.S. Pat. No. 4,076,842; ZSM-35 in U.S. Pat. No. 4,016,245; ZSM-38 in U.S. Pat. No. 4,046,859; ZSM-48 in U.S. Pat. No. 4,350,835; and ZSM-50 in U.S. Pat. No. 4,640,829.

Other intermediate pore zeolites which can be used as the substrate of the catalysts contemplated for use in the pre-engine reformer of this invention are the aluminophosphates (AlPOs), particularly ALPO-11, ALPO-31 and ALPO-41, disclosed in U.S. Pat. No. 4,310,440; silicoaluminophosphates (SAPOs), particularly SAPO-11, SAPO-31 and SAPO-41, disclosed in U.S. Pat. No. 4,440,871; any of certain metals, viz., Fe, Mg, Mn, Co or Zn, combined with aluminophosphate (MeALPOs), particularly MeALPO-11, 31 and -41, disclosed in U.S. Pat. Nos. 4,544,143 and 4,567,029; and any of certain other elements, viz., As, Be or Ti, combined with aluminophosphate (ElAPOs) particularly ElAPO-11, disclosed in U.S. Pat. No. 4,500,651. The zeolites mentioned in this paragraph are also described by E. M. Flanigen et al., "Aluminophosphate Molecular Sieves and the Periodic Table" published in *New Developments in Zeolite Science and Technology*, Studies in Surface Science and Calalysis 28, 103–112, Kodanska-Elsevier (1986).

The entire disclosures of the patents and article cited in the preceding two paragraphs are incorporated by reference insofar as their disclosures are necessary to identify the respective zeolites. It is to be understood that by incorporating by reference the foregoing patents to describe examples of specified members of the novel class with greater particularity, it is intended that identification of the therein disclosed crystalline zeolites be resolved on the basis of their respective X-ray diffraction patterns. As discussed above, the present invention in the case of aluminosilicates contemplates utilization of such catalysts prepared in the manner described, wherein the mole ratio of silica to alumina is at least about 20 with no maximum limit. The incorporation of the identified patents should therefore not be construed as limiting the disclosed crystalline aluminosilicate zeolites to those having the specific silica/alumina mole ratios discussed therein, it now being known that such zeolites may have higher silica/alumina ratios and yet, having the same crystal structure as the disclosed materials, may be useful or even preferred in some applications. In the case of the zeolites and "modified" zeolites disclosed hereinbefore, it is the crystal structure, as identified by the X-ray diffraction "fingerprint", which establishes the identity of the specific crystalline zeolite material.

The preferred crystalline zeolites for utilization herein include ZSM-5, ZSM-11, ZSM-12, ZSM-23, ZSM-35, ZSM-38 and ZSM-48, and ZSM-50, with ZSM-5 being particularly preferred.

In a preferred aspect of this invention, the zeolites hereof are selected as those providing among other things a crystal framework density, in the dry hydrogen form, of not less than about 1.6 grams per cubic centimeter. Therefore, the preferred zeolites useful with respect to this invention are those having X-ray diffraction patterns similar to those of acidic zeolites which have a Constraint Index as defined above of about 1 to about 12, a silica to alumina mole ratio of at least about 20 in the case of aluminosilicate or substantially pure silica zeolites, and a dried crystal density of not less than about 1.6 grams per cubic centimeter. The dry density for known structures may be calculated from the number of silicon plus aluminum atoms per 1000 cubic angstroms, as given, e.g., on Page 19 of the article ZEOLITE STRUCTURE by W. M. Meier. This paper, the entire contents of which are incorporated herein by reference, is included in PROCEEDINGS OF THE CONFERENCE OF MOLECULAR SIEVES, (London, April 1967) published by the Society of Chemical Industry, London, 1968.

When the crystal structure is unknown, the crystal framework density may be determined by classical pycnometer techniques. For example, it may be determined by immersing the dry hydrogen form of the zeolite in an organic solvent which is not absorbed by the crystal. Or, the crystal density may be determined by mercury porosimetry, since mercury will fill the interstices between crystals but will not penetrate the intra-crystalline free space.

It is possible that the unusual sustained activity and stability of this special class of zeolites is associated with a high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites, including some which are not within the purview of this invention, are:

|  | Void Volume | Framework Density |
|---|---|---|
| Ferrierite | 0.27 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The catalysts of the invention can be combined with a substantially non-acid matrix or binder material to render them attrition resistant and more resistant to the severity of the conditions to which they will be exposed during use in a pre-engine reformer. The combined compositions can contain 1 to 99 weight percent of the catalyst of the invention based on the combined weight of the matrix (binder) and catalyst. A preferred matrix or binder material is silica.

As stated, the catalysts utilized in the pre-engine reformer of this invention do not exhibit any appreciable acid activity. These catalysts would meet the criteria of non-acidic catalysts described by Davis and Venuto, J. CATAL. Vol. 15, p. 363 (1969). Thus, a non-equilibrium mixture of xylenes are formed from either n-octane or each individual methylheptane isomer, with the n- octane yielding more o-xylene and 2-methyl-heptane yielding mostly m-xylene, at conversions between and 60%. Alternatively, the non-acidic compositions will exhibit a pH of at least 6 when added to distilled dionized pH 7 water maintained under inert (such as argon) atmosphere; an inert atmosphere in this context means an atmosphere free of $CO_2$. Typically, in these tests, 100 mg of catalyst are added to 30 ml. of distilled deionized water. Some compositions will exhibit a pH of at least 7.5.

At least some of the Group VIII hydrogenation/dehydrogenation metallic element in the catalyst, e.g. platinum, may be intrazeolitic, that is, some of that element is within the pore structure of the crystal, although some of it can be on the surface of the crystal. A test for determining whether, for example, Pt is intrazeolitic or extrazeolitic in the case of ZSM-5 is reported by R. M. Dessau, J. CATAL. Vol. 89, p. 520 (1984). The test is based on the selective hydrogenation of olefins.

Any refinery stream of relatively low octane number and capable of being converted into fuel of higher octane number suitable for use in an internal combustion engine may be fed into the pre-engine reformer contemplated under this invention. Preferably, however, at least 70 wt. % of the feed stream will be composed of compounds having 5 to 11 carbon atoms. Most preferably, the feed stream is a straight run or hydrotreated naphtha having a boiling range at atmospheric pressure within the range of about 120° to 375° F.

In general, the temperature of conversion in the pre-engine reformer will be at least about 800° F., preferably about 900° to 1100° F. If air or other oxygen-containing gas is added to the incoming fuel before it enters the pre-engine reformer or the fuel channel system of a dual converter, the amount of added oxygen will generally be in the range, for example, of about 0.01 to 0.1 moles per mole of hydrocarbon. Preferably, the pre-engine reformer is operated without any hydrogen and at a pressure no higher than about 100 psig.

The following examples further illustrate the invention.

EXAMPLE 1

An as-synthesized, substantially non-acid ZSM-5 zeolite having a silica/alumina ratio of 26,000, was calcined in air for several hours at 538° C. and slurried for several hours with an aqueous solution of $Pt(NH_3)_4Cl_2$ $H_2O$. After washing, drying and filtering, the catalyst was thermally treated in $O_2$, heated at ½° C./min to 350° C., and held at that temperature for one hour, and was found to contain 4 wt. % of platinum.

As an indication of the effectiveness of this catalyst in a pre-engine reformer, 2.1 grams of the catalyst were charged to a reactor and a hydrotreated naphtha (bp=160° F. to 364° F.) with a clear research octane number (RON+O) of 38 was passed over the catalyst at 485° C., WHSV=2.1 under an autogenous pressure of 250 psig with no gas co-feed. The recovered liquid, comprising 70 wt. % of the feed, had a clear research octane number of 96.

EXAMPLE 2

The same 4 wt. % Pt/non-acid ZSM-5 described in Example 1 was used to convert the same hydrotreated naphtha at 385° C., WHSV=2.1 but at atmospheric pressure. The recovered liquid, comprising 92 wt. % of the feed, had a clear research octane number of 89.6.

EXAMPLE 3

This and the following example illustrate the effectiveness of a substantially non-acid ZSM-5 containing indium (In-ZSM-5) in a pre-engine reformer for purposes of this invention.

Indium nitrate, $In(NO_3)_3$, in an amount of 0.85 g and 2.66 g NaOH pellets were dissolved in 180.2 g de-ionized water, then 5.64 g tetrapropylammonium bromide (TPABr) was dissolved in this basic solution. The solution was transferred to a 300 ml stainless steel autoclave, and 15.0 of silica gel (SPEX) with very low aluminum contamination, was added. The autoclave was then sealed and stirring and heating was begun, resulting in the formation of a hydrogel described by the following mole ratios:

| | |
|---|---|
| $SiO_2/In_2O_3$ | 150 |
| $H_2O/SiO_2$ | 48 |
| $OH^-/SiO_2$ | 0.26 |
| $Na^+/SiO_2$ | 0.31 |
| $TPA^+/SiO_2$ | 0.10 |

The hydrogel was reacted at 160° C. for 2 days at a stirring rate of 400 rpm before quenching. The substantially non-acid crystalline product was filtered, washed, and dried. X-ray powder diffraction analysis showed the product to be 100% crystalline ZSM-5, when compared to the diffraction pattern of a conventional ZSM-5, and elemental analysis of the ZSM-5 product showed it to contain 2.26 wt. % of indium, 0.56 wt. % of sodium, 83.85 wt. % silica, and 0.005 wt % of aluminum, 7.93 wt. % of carbon, and 0.74 wt. % of nitrogen.

These results expressed in mole ratios were: C/N=12.5; moles/mole $In_2O_3$: $Na_2O$=1.23, $Al_2O_3$=0.009, and $SiO_2$=142.

Platinum incorporation was accomplished as follows: The as-synthesized zeolite was heated in nitrogen to 520° C. at 1° C./min and held there for 6 hours. It was then calcined in air in a similar manner. The calcined zeolite (3 g) was stirred in a solution of 150 mg $Pt(NH_3)_4Cl_2.H_2O$ in 100 ml water at room temperature overnight. After being washed, filtered and dried, the ion-exchanged zeolite was found to contain 0.41 meq $NH_3$/g ash, which is equivalent to 1.89% Pt on sample. The platinum tetramine zeolite was then calcined in oxygen to 350° C. at 0.5° C./min and held there for 1 hour. Elemental analysis indicated the presence of 1.85% Pt on the final catalyst.

One gram of the foregoing catalyst was charged to a reactor and was used to convert a full range virgin naphtha at 538° C., WHSV=0.8, atmospheric pressure with no gas co-feed. The liquid product, comprising 89 wt. % of the feed, had a clear research octane number substantially higher than that of the feed, as indicated by a product aromatics content of 53.2 wt. % compared with a feed aromatics content of 14.2%

EXAMPLE 4

Using the procedure of Example 3, a substantially non-acid ZSM-5 zeolite catalyst was prepared containing 2.3 wt. % of platinum, 1.9 wt. % of indium, and 358 ppm of aluminum. Two grams of this catalyst were charged to a reactor and used to convert a low octane (RON+O=70) reformate at 100 psig, 540° C., WHSV=2.9 hr$^{-1}$ with no gas co-feed. Table I compares the composition of the feed with that of the reaction product. The recovered liquid comprised 87.6 wt. % of the feed.

TABLE I

| Feed and Product Compositions, wt. % | | |
|---|---|---|
| Component | Feed | Product |
| n-C$_6$ | 7.4 | 2.4 |
| n-C$_7$ | 6.1 | 0.6 |
| MeC$_6$ | 9.3 | 2.0 |
| Benzene | 1.6 | 6.9 |
| Toluene | 6.1 | 18.6 |
| C$_8$ Aromatics | 11.5 | 22.0 |

The clear research octane number of the product is substantially higher than that of the feed in view of the larger percentage of aromatics and smaller percentage of paraffins in the product.

Examples 5 and 6 illustrate the superiority of the catalysts contemplated under this invention, as compared with a conventional platinum containing reforming catalyst, with regard to aging rates of both types of catalyst (RON+O vs. time on stream) under conditions typical of those which would be utilized in a pre-engine catalytic reformer.

EXAMPLE 5

The catalyst of Example 1 was utilized over a period of time for the reforming of a light paraffin naphtha feedstock having the properties indicated in Table II:

TABLE II

| API Gravity at 60° F. | 72.4 |
|---|---|
| Density at 60° F. | 0.6939 |
| Hydrogen, wt. % | 15.52 |
| Sulfur, ppmw | 0.02 |
| Nitrogen, ppmw | <0.2 |
| Average Molecular Wt. | 90.6 |
| Octane, RON + 0 | 51.1 |
| RVP | 4.5 |
| Distillation | |
| 5% | 157 |
| 50%, °F. | 171 |
| 95%, °F. | 203 |
| Paraffins, wt. % | 78.5 |
| Naphthenes | 15.7 |
| Aromatics | 5.8 |

The feedstock was reformed by passing it over the catalyst of Example 1 at a temperature of 1000° F., a pressure of 50 psig, a space velocity of 1.0 LHSV, and with no added hydrogen. The C$_5$+ portions of the product samples tested after more than 4 days and up to 8 days on stream had clear research octane numbers of at least 100.

A conventional Pt/chlorided Al$_2$O$_3$ reforming catalyst was tested using the same feedstock and reforming conditions as those described in this example. The catalyst had a Pt content of 0.61 wt. % and was supported on eta-alumina with an initial chloride level of 0.67%. The Pt component was well dispersed (Heat/Pt=0.76) as measured by hydrogen chemisorption.

After only 2 to 3 hours on stream, the catalyst coked up and lost all activity.

EXAMPLE 6

The feedstock of Example 5 was reformed as described in Example 5 except that the catalyst was the indium-containing catalyst of Example 4. Product samples tested after more than 4 days and up to 8 days on stream all had clear research numbers at least 100.

EXAMPLE 7

This example indicates the suitability of a substantially non-acid platinum containing ZSM-5 type borosilicate for use in a pre-engine reformer in accordance with this invention.

The ZSM-5 type borosilicate was synthesized at 170° C. from a mixture of 12.5 g high purity silica (SPEX), 105 g 20% tetramethylammonium hydroxide, and 0.8 g boric acid. The as-synthesized zeolite was then calcined in nitrogen and then in air at 520° C. The calcined zeolite contained 41.39% Si, 0.015% Al, and 0.44% B.

Two grams of the calcined borosilicate was impregnated with 135 mg In(NO$_3$)$_3$, and calcined in air at 500° C. for 2 hours. 1.8 g of this material was then ion-exchanged with 28 mg Pt(NH$_3$)$_4$Cl$_2$ in 100 ml water at room temperature. TGA analysis in hydrogen indicated the presence of 0.18 meq N/g equivalent to 0.87% Pt. The platinum-exchanged zeolite was then calcined in oxygen to 350° C. at 0.5° C./min.

Use of this catalyst in carrying out the reforming procedure of Example 2 at atmospheric pressure with no gas co-feed results in a product having a substantially higher research octane number than the feed.

EXAMPLE 8

This example illustrates the suitability of a substantially non-acid platinum and tin-containing ZSM-5 for use in the pre-engine reformer of this invention.

Stannous sulfate, Sn(II)SO$_4$, in an amount of 0.69 g was dissolved in 170 g de-ionized water and 3.39 g NaOH was added. To this was added 6.38 g tetrapropylammonium (TPA) bromide. The mixture was transferred to a 300 ml stainless steel autoclave and 16.0 g of a low aluminum content silica gel (SPEX Ind.) was added with stirring. The hydrogel formed by this reaction mixture is described by the following mole ratios:

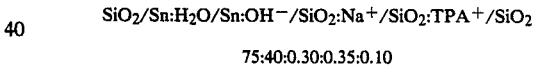

$$SiO_2/Sn:H_2O/Sn:OH^-/SiO_2:Na^+/SiO_2:TPA^+/SiO_2$$

$$75:40:0.30:0.35:0.10$$

The hydrogel was reacted at 160° C. for 5 days with stirring (400 rpm) before quenching. The resulting crystalline product was processed in the usual manner by filtering, washing, and drying. X-ray diffraction analysis of the product zeolite showed it to be 100% crystalline ZSM-5.

The as-synthesized tin-containing zeolite was calcined first in nitrogen and then in air at 520° C. The calcined material was ion-exchanged with an aqueous solution of 15-20 mg of Pt(NH$_3$)$_4$H$_2$O per gram of zeolite, at room temperature. The platinum containing zeolite was then calcined in oxygen to 350° C. at 0.5° C./min. The final catalyst contained 0.92 wt. % of platinum, 2.7 wt. % of tin and 0.012 wt. % of aluminum.

When the reforming procedure of Example 2 is carried out at atmospheric pressure with no gas co-feed using the same feedstock and the tin-containing ZSM-5 catalyst of this example, the product is found to have a significantly higher research octane number than the feed.

EXAMPLE 9

This example illustrates the suitability of a substantially non-acid platinum and thallium containing ZSM-5 zeolite for use in the pre-engine reformer of this invention.

A solution was prepared dissolving 0.85 g TlNO₃ in 170.6 g de-ionized water and then adding 2.05 g NaOH pellets. After all the base had dissolved, 6.38 g tetrapropylammonium bromide (TPABr) was added. The resulting solution was transferred to a 300 ml stainless steel autoclave and 16.0 g of silica gel (SPEX Ind.) was stirred into the solution. The hydrogel produced can be described by the following mole ratios:

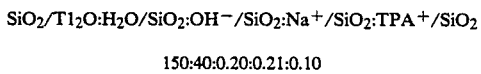

150:40:0.20:0.21:0.10

The hydrogel was heated in the autoclave for 4 days at 160° C., with stirring (400 rpm). The product was filtered, washed and dried. X-ray diffraction analysis indicated it to be 100% crystalline ZSM-5.

Elemental analysis indicated the presence of 8.26% C, 1.88% H, 0.74% N, 4.33% Tl, 0.34% Na, 80.65% SiO₂, and 0.0095% Al.

The as-synthesized thallium silicate was calcined, first in nitrogen and then in air, at 520° C. The calcined zeolite contained 2.43% Tl, 38 ppm Al, and 43.15% Si.

Platinum was incorporated by ion exchange with Pt(NH₃)₄Cl₂ (15 mg/g zeolite) at room temperature. TGA ammonia titration indicated the presence of 0.67% Pt. The platinum-containing zeolite was then calcined in oxygen to 350° C. at 0.5°/min.

Use of this catalyst in carrying out the reforming procedure of Example 2 at atmospheric pressure with no gas co-feed results in a product of greatly increased research octane number as compared with that of the feed.

EXAMPLE 10

This example illustrates the suitability of a substantially non-acid platinum and lead containing ZSM-5 zeolite for use in the pre-engine reformer of this invention.

A solution A was prepared by dissolving 3.31 g Pb(NO₃)₂ in 338.8 g de-ionized water. A solution B was prepared by dissolving 12.4 g NaOH in 300 g de-ionized water. 23.94 g TPA bromide was then dissolved in solution B, which was then poured into solution A. 60.0 g silica gel (SPEX Ind.) was placed in a 1-liter stainless steel autoclave. The solution was then transferred to the autoclave, and the mixture was stirred for two minutes before sealing the autoclave. Stirring and heating were begun immediately.

The composition of the hydrogel formed is described by the following mole ratios:

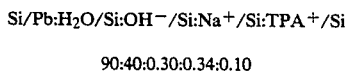

90:40:0.30:0.34:0.10

The zeolite crystallization was carried out at 160° C. with stirring at 400 rpm for 4 days. The product ZSM-5 analyzed for 7.95% C, 0.71% N, 0.97% Na, 4.0% Pb, 86.48% ash, and 235 ppm Al₂O₃.

Platinum was incorporated by ion exchange with Pt(NH₃)₄Cl₂ at room temperature using 30 mg/g zeolite, and the catalyst was then calcined in O₂ at 350° C.

The catalyst contained 1.4% Pt, 4.5% Pb, 0.63% Na and 275 ppm Al₂O₃.

Use of this catalyst in carrying out the reforming procedure of Example 2 at atmospheric pressure with no gas co-feed results in a product of greatly increased research octane number as compared with that of the feed.

We claim:

1. A method of operating an internal combustion engine comprising subjecting a hydrocarbon fuel of relatively low octane number to in situ reforming at elevated temperatures by passing it through a reaction zone containing a substantially non-acid catalyst comprising a Group VIII hydrogenation/dehydrogenation metallic element and a substantially non-acid intermediate pore zeolite, such that the fuel leaving said reaction zone has an increased octane number, and passing the fuel to the combustion chamber of said engine.

2. The method of claim 1 wherein said zeolite has an X-ray diffraction pattern similar to that of an acidic zeolite which has a Constraint Index in the approximate range of about 1 to 12.

3. The method of claim 1 wherein said Group VIII metallic element is platinum.

4. The method of claim 2 wherein said zeolite as synthesized is a ZSM-5 aluminosilicate or silica.

5. The method of claim 4 wherein said ZSM-5 has a silica/alumina ratio of at least 20.

6. The method of claim 5 wherein said silica/alumina ratio is at least 100.

7. The method of claim 1 wherein the catalyst contains a modifier metallic element selected from the group consisting of indium, tin, thallium, lead, and mixtures thereof.

8. The method of claim 7 wherein said modifier is indium.

9. The method of claim 7 wherein said modifier is tin.

10. The method of claim 7 wherein said modifier is thallium.

11. The method of claim 7 wherein said modifier is lead.

12. The method of claim 7 wherein said non-acid zeolite is synthesized in the presence of said modifier.

13. The method of claim 1 wherein said zeolite as an aluminosilicate which, as synthesized, has a silica/alumina ratio of at least 20 and some acidity, and is aftertreated to render it substantially non-acid.

14. The method of claim 13 wherein said aftertreatment comprises removal of aluminum.

15. The method of claim 13 wherein said aftertreatment comprises the exchange of cations with alkali metal or alkaline earth cations.

16. The method of claims 2 wherein said non-acid zeolite in ZSM-11.

17. The method of claim 2 wherein said non-acidic zeolite is ZSM-48.

18. The method of claim 2 wherein said non-acid zeolite is ZSM-50.

19. The method of claim 1 wherein said non-acid zeolite is ALPO-11, ALPO-31, ALPO-41, SAPO-11, SAPO-31 or SAPO-41.

20. The method of claim 1 wherein said catalyst is part of a monolithic structure containing unidirectional channels with rigid walls.

* * * * *